US012353591B2

(12) United States Patent
Polychroniadou et al.

(10) Patent No.: US 12,353,591 B2
(45) Date of Patent: Jul. 8, 2025

(54) SECURE AGGREGATION OF INFORMATION USING FEDERATED LEARNING

(71) Applicant: JPMorgan Chase Bank, N.A., New York, NY (US)

(72) Inventors: Antigoni Ourania Polychroniadou, New York, NY (US); Tucker Richard Balch, Suwanee, GA (US); Yue Guo, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 282 days.

(21) Appl. No.: 17/662,008

(22) Filed: May 4, 2022

(65) Prior Publication Data

US 2022/0374544 A1     Nov. 24, 2022

Related U.S. Application Data

(60) Provisional application No. 63/188,761, filed on May 14, 2021.

(30) Foreign Application Priority Data

May 5, 2021   (GR) .............................. 20210100296

(51) Int. Cl.
*G06F 21/62*      (2013.01)
*G06F 21/12*      (2013.01)
(Continued)

(52) U.S. Cl.
CPC ........ *G06F 21/6245* (2013.01); *G06F 21/121* (2013.01); *G06F 21/6254* (2013.01);
(Continued)

(58) Field of Classification Search
CPC ............... G06F 21/121; G06F 21/6245; G06F 21/6254; H04L 9/0841; H04L 9/3013;
(Continued)

(56) References Cited

U.S. PATENT DOCUMENTS

2020/0285980 A1 * 9/2020 Sharad ................... G06N 20/20
2020/0364608 A1 * 11/2020 Anwar ................... G06N 20/00
(Continued)

OTHER PUBLICATIONS

Bonawitz, K., et al.(2017, October). Practical secure aggregation for privacy-preserving machine learning. In proceedings of the 2017 ACM SIGSAC Conference on Computer and Communications Security (pp. 1175-1191) (Year: 2017).*

(Continued)

*Primary Examiner* — Thomas J Dailey
(74) *Attorney, Agent, or Firm* — GREENBLUM & BERNSTEIN, P.L.C.

(57) ABSTRACT

A method for learning a shared machine learning model while preserving privacy of individual participants is provided. The method includes: receiving, from each of a group of users, an encrypted user input; when a number of user inputs is greater than or equal to a threshold, transmitting, to each user, a list of the group of users; receiving, from each user, a message indicating a mutual agreement regarding a shared secret among the group; and when a number of received messages indicating the mutual agreement is greater than or equal to the threshold, determining information about the shared machine learning model by combining the received encrypted user inputs. The shared machine learning model facilitates a secure multi-party computation of a function that generates an updated version of the shared machine learning model.

17 Claims, 18 Drawing Sheets

(51) Int. Cl.
   *H04L 9/08*   (2006.01)
   *H04L 9/30*   (2006.01)
   *H04L 9/32*   (2006.01)

(52) U.S. Cl.
   CPC .......... *H04L 9/0841* (2013.01); *H04L 9/3013* (2013.01); *H04L 9/3247* (2013.01); *H04L 9/3263* (2013.01); H04L 2209/42 (2013.01); H04L 2209/46 (2013.01); H04L 2209/56 (2013.01)

(58) Field of Classification Search
   CPC . H04L 9/3247; H04L 9/3263; H04L 2209/42; H04L 2209/46; H04L 2209/56
   See application file for complete search history.

(56) References Cited

U.S. PATENT DOCUMENTS

| | | | | |
|---|---|---|---|---|
| 2021/0143987 | A1* | 5/2021 | Xu | H04L 9/0819 |
| 2021/0174243 | A1* | 6/2021 | Angel | H04L 9/083 |
| 2022/0044162 | A1* | 2/2022 | Zhang | G06F 21/64 |
| 2023/0214715 | A1* | 7/2023 | Cheng | G06N 7/01 706/12 |
| 2023/0325679 | A1* | 10/2023 | Wang | G06N 3/045 706/25 |

OTHER PUBLICATIONS

Byrd, D., & Polychroniadou, A. (2020, October). Differentially private secure multi-party computation for federated learning in financial applications. In Proceedings of the First ACM International Conference on AI in Finance (pp. 1-9) (Year: 2020).*

Wainakh, Aidmar, Alejandro Sanchez Guinea, Tim Grube, and Max Mühlhäuser. "Enhancing privacy via hierarchical federated learning." In 2020 IEEE European Symposium on Security and Privacy Workshops (EuroS&PW), pp. 344-347. IEEE, 2020. (Year: 2020)*

* cited by examiner

Algorithm 1 Setup (with RO)

700

This protocol uses the following algorithms defined in Section 1: a Public key infrastructure, a Diffie-Hellman key exchange scheme (KA.setup, KA.gen, KA.agree); a CCA2-secure authenticated encryption scheme (AE.enc, AE.dec); a Shamir's secret sharing scheme (SS.share, SS.recon, SS.exponentShare, SS.exponentRecon). It proceeds as follows:

Input: A central server $S$ and a user set $\mathcal{U}$ of $n$ users. Each user can communicate with the server through a private authenticated channel. All parties are given the public parameters: the security parameter $\kappa$, the number of users $n$, a threshold value $t$, honestly generated $pp \leftarrow$ KA.setup$(\kappa)$ for key agreement, the input space, and a field $\mathbb{Z}_q$ for secret sharing.

Moreover, every party $i$ holds its own signing key $d_i^{SK}$ and a list of verification keys $d_j^{PK}$ for all other parties $j$. The server $S$ also has all users' verification keys.

Output: Every user $i \in \mathcal{U}$ either obtains a set of users $\mathcal{U}_i$ such that $|\mathcal{U}_i| \geq t$ and a share $r_{j,i}$ of a secret value $r_j$ for each $j \in \mathcal{U}_i$ or aborts. The server either outputs a set of users $\mathcal{U}_S$ such that $|\mathcal{U}_S| \geq t$ or aborts.

Round 1: Encryption Key Exchange

1. Each user $i \in \mathcal{U}$: generates a pair of encryption keys $(sk_i, pk_i) \leftarrow$ KA.gen$(pp)$, then signs the public encryption key $pk_i$ with $d_i^{SK}$ and sends $(pk_i, \sigma_i)$ to the server, in which $\sigma_i$ denotes the signature by user $i$.

2. Server $S$: On receiving $(pk_j, \sigma_j)$ from user $j$, the server verifies the signature $\sigma_j$ with $d_j^{PK}$. If the signature verification fails, ignore the message from user $j$. Otherwise, add $j$ to a user list $\mathcal{U}_S^1$. If $|\mathcal{U}_S^1| < t$ after processing all messages from users, $S$ aborts. Otherwise, the server sends all public keys and signatures it receives from users $j \in \mathcal{U}_S^1$ to each user in $\mathcal{U}_S^1$.

Round 2: Mask Sharing

3: Each user $i$: On receiving $(pk_j, \sigma_j)$ for a user $j \in \mathcal{U}$ from the server, each user $i$ verifies the signatures $\sigma_j$ with $pk_j$. It aborts if any signature verification fails or that indicates the server is corrupt. Otherwise, it puts $j$ into a user list $\mathcal{U}_i^1$ and stores $ek_{i,j} = KA.agree(pk_j, sk_i)$. It aborts if $|\mathcal{U}_i^1| < t$ after processing all received messages. Otherwise, user $i$ uniformly randomly chooses $r_i$, and calculates the secret shares of $r_i$ by $\{r_{i,j}\}_{j \in \mathcal{U}_i^1} \leftarrow SS.share(r_i, \mathcal{U}_i^1, t)$. Then it encrypts each share $r_{i,j}$ by $c_{i,j} \leftarrow AE.enc(r_{i,j}, ek_{i,j})$ and sends all encrypted shares $\{c_{i,j}\}_{j \in \mathcal{U}_i^1}$ to the server.

4: Server $S$: If it receives messages from less than $t$ users, abort. Otherwise, it denotes this set of users with $\mathcal{U}_S$. It sends each $c_{i,j}$ to the corresponding receiver $j$ for each $i \in \mathcal{U}_S$. Then it outputs the client set $\mathcal{U}_S$.

Round 3: User Receiving Shares

5: Each user $i$: If it receives $c_{j,i}$ for less than $t$ users $j$ from the server, abort. Otherwise, decrypt each encrypted share by $r_{j,i} = AE.dec(c_{j,i}, ek_{i,j})$. If the decryption of the share from user $j$ fails, it ignores the encrypted share. Otherwise, it puts $j$ into a user set $\mathcal{U}_i^2$ and stores $r_{j,i}$. If $|\mathcal{U}_i^2| < t$ after processing all shares, it aborts. Otherwise, it stores $r_i$, the set $\mathcal{U}_i = \mathcal{U}_i^2$, and all $r_{j,i}$ for $j \in \mathcal{U}_i$.

FIG. 7B

Algorithm 2 SecAgg (With RO)

This protocol uses the following algorithms defined in Section 1: a Public key infrastructure, a Shamir's secret sharing scheme (SS.share, SS.recon, SS.exponentShare, SS.exponentRecon), a random oracle $H(\cdot)$. It proceeds as follows:

Input: Every user $i$ holds its own signing key $\ell_i^{SK}$ and all users' verification key $\ell_j^{VK}$, $r_i$, a list of users $\mathcal{U}_i$, and $r_{j,i}$ for every $j \in \mathcal{U}_i$ it obtains in the Setup phase. Moreover, it also holds a secret input $x_i^k$ for every iteration $k$. The server $S$ holds all users' verification keys, all public parameters it receives in the Setup phase, and a list of users $\mathcal{U}_S$ which is its output of the Setup phase.

Output: For each iteration $k$, if there are at least $t$ users being always online during iteration $k$, then at the end of iteration $k$, the server $S$ outputs $\sum_{i \in O^k} x_i^k$, in which $O^k$ denotes a set of users of size at least $t$.

Note: For simplicity of exposition, we omit the superscript $k$ of all variables when it can be easily inferred from the context.

1: for iteration $k = 1, 2, \ldots$ do

Round 1: Secret Sharing:

2: User $i$: It calculates $X_i = x_i + r_i$ and sends $H(k)^{X_i}$ to the server.

3: Server $S$: If it receives messages from less than $t$ users, abort. Then it checks if there exist at least $t$ users $i$ such that $\mathcal{U}_i$ are the same. If not, abort. Otherwise, denote this set of user $i$ with $O$. It sends $O$ to all users $i \in O$.

Round 2: Online Set Checking (Only needed in Malicious setting):

4: User $i$: On receiving $O$ from the server, it first checks that $O \subseteq \mathcal{U}_4$ and $|O| \geq t$ and then signs the set $O$ and sends the signature $\sigma_i$ to the server.

5: Server $S$: If it receives less than $t$ valid signatures on $O$, abort. Otherwise, it forwards all valid signatures to all users in $O$.

Round 3: Mask Reconstruction on the Exponent:

6: User $i$: On receiving signatures from the server, it first verifies the signatures with $O$ and the verification keys of the other users. If there are less than $t$ valid signatures, abort. Otherwise, it calculates $\zeta_i = H(k)^{\sum_{i \in O} r_{j,i}}$. It sends $\zeta_i$ to the server.

7: Server $S$: If it receives $\zeta_i$ from less than $t$ users, abort. Otherwise, let $O'$ denote the set of users $i$ successfully sends $\zeta_i$ to the server in the previous round. The server reconstructs $R_O = SS.\text{exponentRecon}(\{\zeta_i, j\}_{j \in O'}, t)$ and calculates the discrete log of $H(k)^{\sum_{i \in O} x_i}/R_O$ to get $\sum_{i \in O} x_i$.

8: end for

FIG. 8B

Algorithm 3 Setup (with RO and Group)

1100

This protocol uses the following algorithms defined in Section 1: a Public key infrastructure, a Diffie-Hellman key exchange scheme (KA.setup, KA.gen, KA.agree); a CCA2-secure authenticated encryption scheme (AE.enc, AE.dec); a Shamir's secret sharing scheme (SS.share, SS.recon, SS.exponentShare, SS.exponentRecon). It also accesses a random oracle $H(\cdot)$, which has range in $\mathbb{Z}_p$. It proceeds as follows:

Input: A central server $S$ and a user set $\mathcal{U}$ of $n$ users. Each user can communicate with the server through a private authenticated channel. All parties are given public parameters: the security parameter $\kappa$, the number of users $n$, a threshold value $t$, honestly generated $pp \leftarrow \text{KA.setup}(\kappa)$ for key agreement, the input space $\mathcal{X}$, a field $\mathbb{F}$ for secret sharing.

Moreover, all clients are uniformly randomly divided into $B$ groups $G_1, \ldots, G_B$, each of which contains $n/B$ clients. For convenience, in the description of the protocol, let $G_{-1} = G_B$, and $G_{B+1} = G_1$.
The user $i$ in group $d$ holds the group index $d$, its own signing key $d_i^{SK}$ and a list of verification keys $d_j^{PK}$ for $j \in [n]$. The server $S$ also has all users' verification keys.

Output: Every user $i \in \mathcal{U}$ who is online through the Setup phase either obtains a set of users $\mathcal{U}_t$ of size at least $t$ and two shares $r_{j,i}, h_{j,i}$ for each $j \in \mathcal{U}_t$ or abort. The server either obtains a set of users $\mathcal{U}_S$ such that $|\mathcal{U}_S| \geq Bt$ and a global mask $h_S$ or abort.

Round 1: Key Exchange:

1. Each user $i \in G_d$: It generates a pair of encryption keys $(\text{pk}_i, \text{sk}_i)$ and two pairs of masking keys $(\text{pk}_i^1, \text{sk}_i^1)$ and $(\text{pk}_i^{-1}, \text{sk}_i^{-1})$. It sends the three public keys with signatures on them to the server.

2. Server $S$: Let $\mathcal{U}_S^1$ denotes the set of users send the server public keys with valid signatures. For $i \in \mathcal{U}_S^1 \cap G_d$, the server distributes the public encryption key $\text{pk}_i$ and the signature received from user $i \in G_d$ to all users in

$\mathcal{U}_S^b \cap (G_d \cup G_{d-1} \cup G_{d+1})$, and distributes the public masking key $sk_i^b$ with the signature to all users in $\mathcal{U}_S^b \cap G_{d+b}$ for $b \in \{-1,1\}$.

Round 2: Secret Mask Key Sharing:

3: Each user $i \in G_d$: Let $\mathcal{U}_i^1 \subseteq G_d \cup G_{d-1} \cup G_{d+1}$. It runs the key exchange algorithm as described in line 3 in Algorithm 1 to generate $ek_{i,j}$, $mk_{i,j}$ and $mk_{i,j}^{-1}$ for $j \in \mathcal{U}_i^1$. Note that now $\mathcal{U}_i^1$ receives the public keys with valid signatures.

It then calculates $t$-out-of-$\frac{n}{B}$ secret shares of $sk_i^b$ among $G_{d+b}$ to generate $\{sk_{i,j}^b\}_{j \in G_{d+b}}$, and encrypts each share with $ek_{i,j}$ to generate cipher text $c_{i,j}^b$ for $b = \{-1,1\}$. It then sends all encrypted shares to the server.

4: Server $S$: If it receives messages with valid signatures from less than $t$ users in group $G_d$ for any $d \in [B]$, abort. Otherwise, let $\mathcal{U}_S^2$ denote the set of users who successfully send the server messages with valid signatures. For each group $d \in [B]$ and each $i \in \mathcal{U}_S^2$ and $c_{i,j}^b$ for $b \in \{1,-1\}$, $\mathcal{U}_S^2 \cap G_{d+b} < t$. If yes, abort.

The server sends the public mutual mask key with the signature $(pk_i^b, \sigma_i^b)$ to all $j \in \mathcal{U}_S^2 \cap G_d$, and sends each encrypted share $c_{i,j}^{sk^b}$ to the corresponding receiver.

Round 3: Mask Sharing:

5: Each user $i \in G_d$: On receiving $(pk_j^b, \sigma_j, c_{j,i}^b)$ for user $j$ in group $G_{d-b}$ for $b \in \{-1,1\}$ from the server, it verifies the signature and abort if the signature verification fails. Otherwise, it runs the key agreement algorithm to get $mk_{i,j}$ with $pk_j^b$ and $sk_i^{-b}$ and puts $j$ into a user list $\mathcal{U}_i^2$. It also decrypts the encrypted share by $sk_{j,i}^b = AE.dec(c_{j,i}^b, ek_{i,j})$. If any $c_{j,i}^b$ is missing or cannot be correctly decrypted, remove $j$ from $\mathcal{U}_i^2$. It then checks if for $b \in \{1,-1\}$, $|\mathcal{U}_i^2 \cap G_{d+b}| < t$. If yes, abort.

Otherwise, user $i$ uniformly randomly chooses a self mask ($r$-mask) and calculates the $h$-mask $h_i := \sum_{j \in \mathcal{U}_i^2 \cap G_{d-1}} mk_{i,j} - \sum_{j \in \mathcal{U}_i^2 \cap G_{d+1}} mk_{i,j}$. Then it calculates the shares of $r_i$ and $h_i$ among $j \in \mathcal{U}_i^2 \cap G_d$ and encrypts the shares with $ek_{i,j}$ as described in line 3 of Algorithm 1. It then sends the encrypted shares $\{c_{j,i}^r, c_{j,i}^h\}_{j \in \mathcal{U}_i^2 \cap G_d}$ to the server.

6: Server $S$: If for any group it receives messages from less than $t$ users in the group, abort. Otherwise, denote the set of all users who successfully sends the server encrypted shares with $\mathcal{U}_S^3$. It sends the shares to the corresponding receiver $j$ for each $i \in \mathcal{U}_S^3$.

Round 4: Agreeing on the Offline User Set:

7: Each user $i \in G_d$: It decrypts each received encrypted share by $r_{j,i} = AE.dec(c_{j,i}^r, ek_{i,j})$, and $h_{j,i} = AE.dec(c_{j,i}^h, ek_{i,j})$. If the decryption of the share from user $j$ fails, it ignores the message from user $j$. Otherwise, it puts $j$ into

FIG. 11B a user set $\mathcal{U}_i^3$ and stores $r_{j,i}'$ and $h_{j,i}'$. If $\mathcal{U}_i^3 < t$ after processing all shares, it aborts. Otherwise, it signs and sends a user list offline$_i = (\mathcal{U}_i^1 \cap G_d) \backslash \mathcal{U}_i^3$ with the signature $\sigma_i$ on the list to the server.

8. Server $\mathcal{S}$: If the server receives offline$_i$ with valid signatures $\sigma_i$ from less than $t$ users $i$ from any group $G_d$, abort. Otherwise, denote the set of users $i$ who send the offline lists with valid signatures to the server with $\mathcal{U}_S^4$. The server sends the list and the signature (offline$_i, \sigma_i$) for all $i \in G_d \cap \mathcal{U}_S^4$ to all users in $(G_{d-1} \cup G_{d+1}) \cap \mathcal{U}_S^4$.

Round 5: Reconstructing Offline Users' Masks:

9. Each user $i \in G_d$: After receiving all user lists with the signature (offline$_j, \sigma_j$) from the server, it verifies the signatures and aborts if any signature verification fails. It also aborts if it receives less than $t$ offline lists with valid signatures from group $G_{d-1}$ or $G_{d+1}$. Otherwise, for group $G_{d-1}$, it checks if there is any user $j' \in G_{d-1} \cap \mathcal{U}_i^2$ being included in at least $t$ offline lists it receives from users in $G_{d-1}$. If yes, it sends sk$_{j',i}^1$ to the server. It repeats the process on $G_{d+1}$. It also outputs $\mathcal{U}_i = \mathcal{U}_i^3$ and $r_{j,i}, h_{j,i}$ for $j \in \mathcal{U}_i$.

10. Server $\mathcal{S}$: For each group $d$, if for a user $i \in G_d$ the server receives at least $t$ shares sk$_{i,j}^b$ from both groups $G_{d\pm b}$ for $b \in \{-1, 1\}$, the server puts $i$ into a user list offline$_S$. Each user in this list fails to share their $r$- and $h$-masks with their group members in Round 3, while the symmetric masking keys mk$_{i,j}$ between itself and the member $j$ of $i$'s neighbor group have been included in the $h_j$. Thus, the server needs to calculate $h_i$ by reconstructing sk$_i^b$, running the key exchange algorithm for $i$ and user $j \in \mathcal{U}_S^4 \cap G_{d+b}$ by mk$_{i,j}$ = KA.agree(pk$_j^1$, sk$_i^{-1}$), for $i$ and user $j \in \mathcal{U}_S^4 \cap G_{d+1}$ by mk$_{i,j}$ = KA.agree(pk$_j^1$, sk$_i^{-1}$) and calculating $h_i = \sum_{j \in \mathcal{U}_S^4 \cap G_{d+1}}$ mk$_{i,j} - \sum_{j \in \mathcal{U}_S^4 \cap G_{d-1}}$ mk$_{i,j}$. Then it obtains $\mathcal{U}_S = \mathcal{U}_S^4 \backslash$offline$_S$ and $h_S = \sum_{i \in \text{offline}_S} h_i$.

FIG. 11C

Algorithm 4 SecAgg (With RO and Group)

This protocol uses the following algorithms defined in Section 1: a Public key infrastructure, a Shamir's secret sharing scheme (SS.share, SS.recon, SS.exponentShare, SS.exponentRecon); a random oracle $H(\cdot)$. It proceeds as follows:

Input: Every user $i \in G_d$ holds its own signing key $d_i^{SK}$ and every user $j$'s verification keys $d_j^{PK}$, $r_i, h_i$, a list of users $\mathcal{U}_i \subseteq G_d$ with $r_{j,i}, h_{j,i}$ for every $j \in \mathcal{U}_i$. Moreover, for every iteration $k$, it also holds a secret input $x_i^k$. The server $S$ holds all inputs it receives in the Setup phase, and the list of users $\mathcal{U}_S$ it outputs in the Setup phase.

Output: For each iteration $k$, if all users are honest and there are at least $t$ users being always online in each group during iteration $k$, then at the end of iteration $k$, the server $S$ outputs $\sum_{i \in O^k} x_i^k$, in which $O^k$ denotes a set of at least $Bt$ users.

Note: For simplicity of exposition, we omit the superscript $k$ of all variables when it can be easily inferred from the context.

1: for iteration $k = 1, 2, \ldots$ do

Round 1: Masked Input:

2:     <u>User $i$</u>: It masks the input by $X_i = x_i + r_i + h_i$ and sends $H(k)^{x_i}$ to the server.

3:     <u>Server $S$</u>: If it receives messages from less than $t$ users from any group, abort. If it receives messages from a user not in $\mathcal{U}_S$, ignore the message. Otherwise, let $O$ denote the set of users $i$ who successfully send the masked input to the server. For each group $G_d$, the server sends $O_d = O \cap G_d$ to all users $i \in O_d$.

Round 2: Online Set Checking:

4:     <u>User $i$</u>: It checks $|O_d| \geq t$, signs $O_d$ and sends back to the server as described in line 4 of Algorithm 2.

5:     <u>Server $S$</u>: It distributes the signatures from users $G_d$ to $O_d$ as described in line 5 of Algorithm 2.

FIG. 12A

Round 3: Mask Reconstruction:

6: User $i$: it checks that it receives at least $t$ valid signatures from the members of $C_d$ on $O_d$. If any signature is invalid, abort. Then it calculates $\zeta_G = H(k)^{\sum_{i \in O_d} r_{j,i} - \sum_{j \in o_A \setminus O_A} h_{j,i}}$ and sends $\zeta_G$ to the server.

7: Server $S$: If it receives $\zeta_G$ from less than $t$ users in group $C_d$, abort. Otherwise, the server calculates $$z = \log_{H(k)} \left( H(k)^{\sum_{i \in O} X_i} / \prod_{d \in [D]} \text{SS.exponentRecon}(\{\zeta_G\}_{i \in O_d}, t) \right)$$

by brute force

8: end for

FIG. 12B

SECURE AGGREGATION OF INFORMATION USING FEDERATED LEARNING

CROSS-REFERENCE TO RELATED APPLICATIONS

This application claims priority benefit from Greek Application No. 20210100296, filed May 5, 2021, which is hereby incorporated by reference in its entirety.

This application claims the benefit from U.S. Provisional Application No. 63/188,761, filed May 14, 2021, which is hereby incorporated by reference in its entirety.

BACKGROUND

1. Field of the Disclosure

This technology generally relates to methods and systems for providing a secure aggregation protocol for federated learning based on secure multi-party computation.

2. Background Information

Modern financial firms routinely need to conduct analysis of large data sets stored across multiple servers or devices. A typical response is to combine those data sets into a single central database, but this approach introduces a number of privacy challenges: The institution may not have appropriate authority or permission to transfer locally stored information, the owner of the data may not want it shared, and centralization of the data may worsen the potential consequences of a data breach. For example, the mobile application ai.type collected personal data from its users' phones and uploaded this information to a central database. Security researchers gained access to the database and obtained the names, email addresses, passwords, and other sensitive information of 31 million users of the Android version of the mobile app. Such incidents highlight the risks and challenges associated with centralized data solutions.

Accordingly, there is a need for a mechanism to address these privacy concerns.

SUMMARY

The present disclosure, through one or more of its various aspects, embodiments, and/or specific features or sub-components, provides, inter alia, various systems, servers, devices, methods, media, programs, and platforms for providing a secure aggregation protocol for federated learning based on secure multi-party computation.

According to an aspect of the present disclosure, a method for learning a shared machine learning model while preserving privacy of individual participants is provided. The method is implemented by at least one processor. The method includes: receiving, from each respective user from among a plurality of users by the at least one processor, a respective encrypted user input; when a number of received encrypted user inputs is greater than or equal to a predetermined threshold, transmitting, by the at least one processor to each respective user, a list of the plurality of users; receiving, from each respective user by the at least one processor, a respective message indicating a mutual agreement regarding a shared secret among the plurality of users; and when a number of received messages indicating the mutual agreement is greater than or equal to the predetermined threshold, determining, by the at least one processor, information about the shared machine learning model by combining the received encrypted user inputs.

The method may further include: receiving, from each respective user, a public encryption key and a respective signature; verifying each respective signature; and transmitting, to each respective user, all received public encryption keys and all received signatures. The respective message that indicates the mutual agreement may be generated by each respective user in response to a verification of the signatures.

The method may be implemented by using a Diffie-Hellman key exchange algorithm.

Each received encrypted user input may be encrypted by using an encryption algorithm.

The method may further include using a public key infrastructure (PKI) to prevent a simulation of an arbitrary number of users.

The shared machine learning model may be configured to facilitate a secure multi-party computation of a function of all of the received encrypted user inputs. The function may be configured to generate an updated version of the shared machine learning model such that each respective user only learns the updated version of the shared machine learning model.

The plurality of users may include at least two financial institutions. Each respective encrypted user input may correspond to a credit card transaction. The shared machine learning model may be configured to determine whether each credit card transaction is a fraudulent credit card transaction.

According to another aspect of the present disclosure, a computing apparatus for learning a shared machine learning model while preserving privacy of individual participants is provided. The computing apparatus includes a processor; a memory; and a communication interface coupled to each of the processor and the memory. The processor is configured to: receive, from each respective user from among a plurality of users via the communication interface, a respective encrypted user input; when a number of received encrypted user inputs is greater than or equal to a predetermined threshold, transmit, to each respective user via the communication interface, a list of the plurality of users; receive, from each respective user via the communication interface, a respective message indicating a mutual agreement regarding a shared secret among the plurality of users; and when a number of received messages indicating the mutual agreement is greater than or equal to the predetermined threshold, determine information about the shared machine learning model by combining the received encrypted user inputs.

The processor may be further configured to: receive, from each respective user via the communication interface, a public encryption key and a respective signature; verify each respective signature; and transmit, to each respective user via the communication interface, all received public encryption keys and all received signatures. The respective message that indicates the mutual agreement may be generated by each respective user in response to a verification of the signatures.

The processor may be further configured to implement the verification of the signatures and the transmission of the received public encryption keys and the received signatures by using a Diffie-Hellman key exchange algorithm.

Each received encrypted user input may be encrypted by using an encryption algorithm.

The processor may be further configured to use a public key infrastructure (PKI) to prevent a simulation of an arbitrary number of users.

The shared machine learning model may be configured to facilitate a secure multi-party computation of a function of all of the received encrypted user inputs. The function may be configured to generate an updated version of the shared machine learning model such that each respective user only learns the updated version of the shared machine learning model.

The plurality of users may include at least two financial institutions. Each respective encrypted user input may correspond to a credit card transaction. The shared machine learning model may be configured to determine whether each credit card transaction is a fraudulent credit card transaction.

According to yet another aspect of the present disclosure, a non-transitory computer readable storage medium storing instructions for learning a shared machine learning model while preserving privacy of individual participants is provided. The storage medium includes executable code which, when executed by a processor, causes the processor to: receive, from each respective user from among a plurality of users, a respective encrypted user input; when a number of received encrypted user inputs is greater than or equal to a predetermined threshold, transmit, to each respective user, a list of the plurality of users; receive, from each respective user, a respective message indicating a mutual agreement regarding a shared secret among the plurality of users; and when a number of received messages indicating the mutual agreement is greater than or equal to the predetermined threshold, determine information about the shared machine learning model by combining the received encrypted user inputs.

The executable code may be further configured to cause the processor to: receive, from each respective user, a public encryption key and a respective signature; verify each respective signature; and transmit, to each respective user, all received public encryption keys and all received signatures. The respective message that indicates the mutual agreement may be generated by each respective user in response to a verification of the signatures.

The executable code may be further configured to cause the processor to implement the verification of the signatures and the transmission of the received public encryption keys and the received signatures by using a Diffie-Hellman key exchange algorithm.

Each received encrypted user input may be encrypted by using an encryption algorithm.

The executable code may be further configured to cause the processor to use a public key infrastructure (PKI) to prevent a simulation of an arbitrary number of users.

The shared machine learning model may be configured to facilitate a secure multi-party computation of a function of all of the received encrypted user inputs. The function may be configured to generate an updated version of the shared machine learning model such that each respective user only learns the updated version of the shared machine learning model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 7A and 7B are a diagram that illustrates a first algorithm for implementing a setup phase with random oracle as part of a method for providing a secure aggregation protocol for federated learning based on secure multi-party computation, according to an exemplary embodiment.

FIGS. 8A and 8B are a diagram that illustrates a second algorithm for implementing a secure aggregation phase with random oracle as part of a method for providing a secure aggregation protocol for federated learning based on secure multi-party computation, according to an exemplary embodiment.

FIGS. 11A, 11B, and 11C are a diagram that illustrates a third algorithm for implementing a setup phase with random oracle and grouping as part of a method for providing a secure aggregation protocol for federated learning based on secure multi-party computation, according to an exemplary embodiment.

FIGS. 12A and 12B are a diagram that illustrates a second algorithm for implementing a secure aggregation phase with random oracle and grouping as part of a method for providing a secure aggregation protocol for federated learning based on secure multi-party computation, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
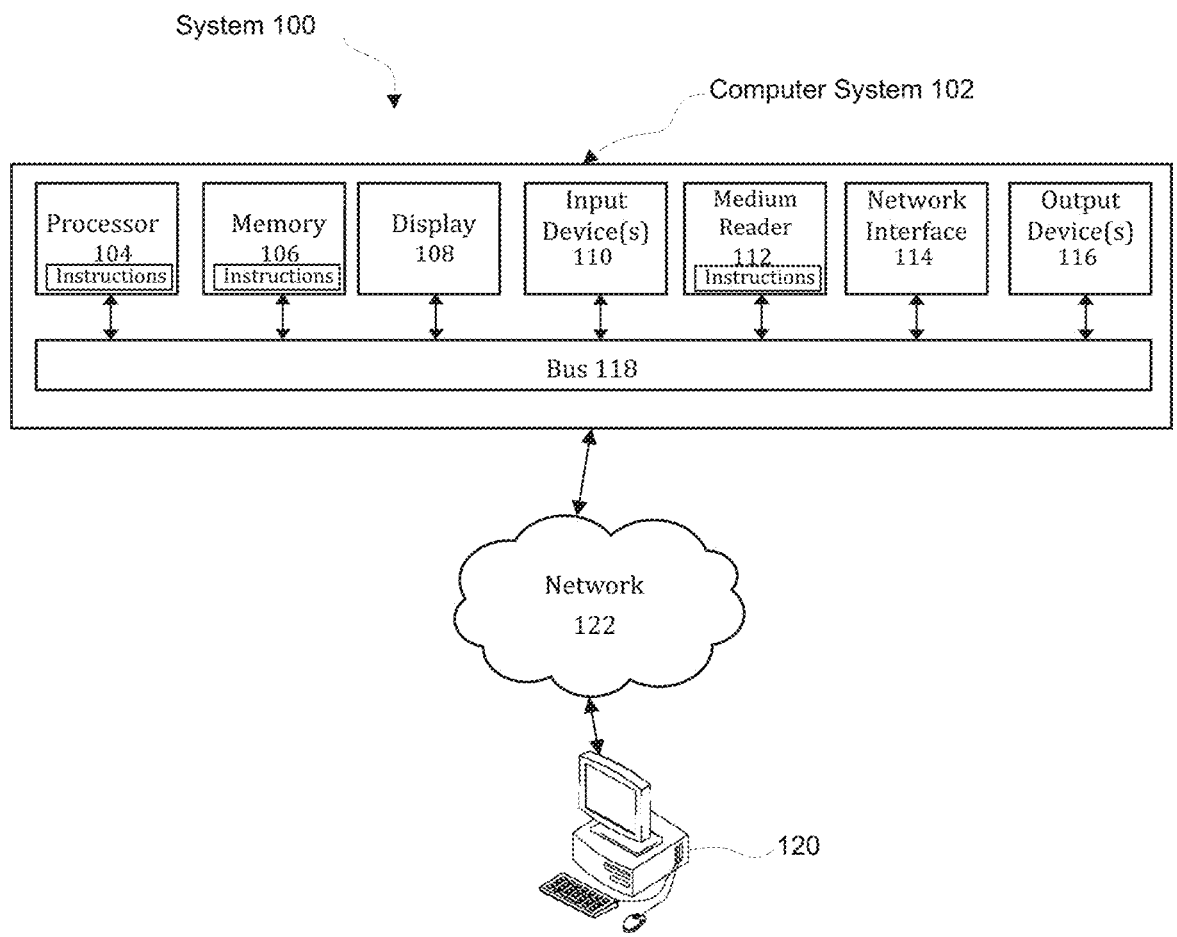
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a secure aggregation protocol for federated learning based on secure multi-party computation.

Figure 2:
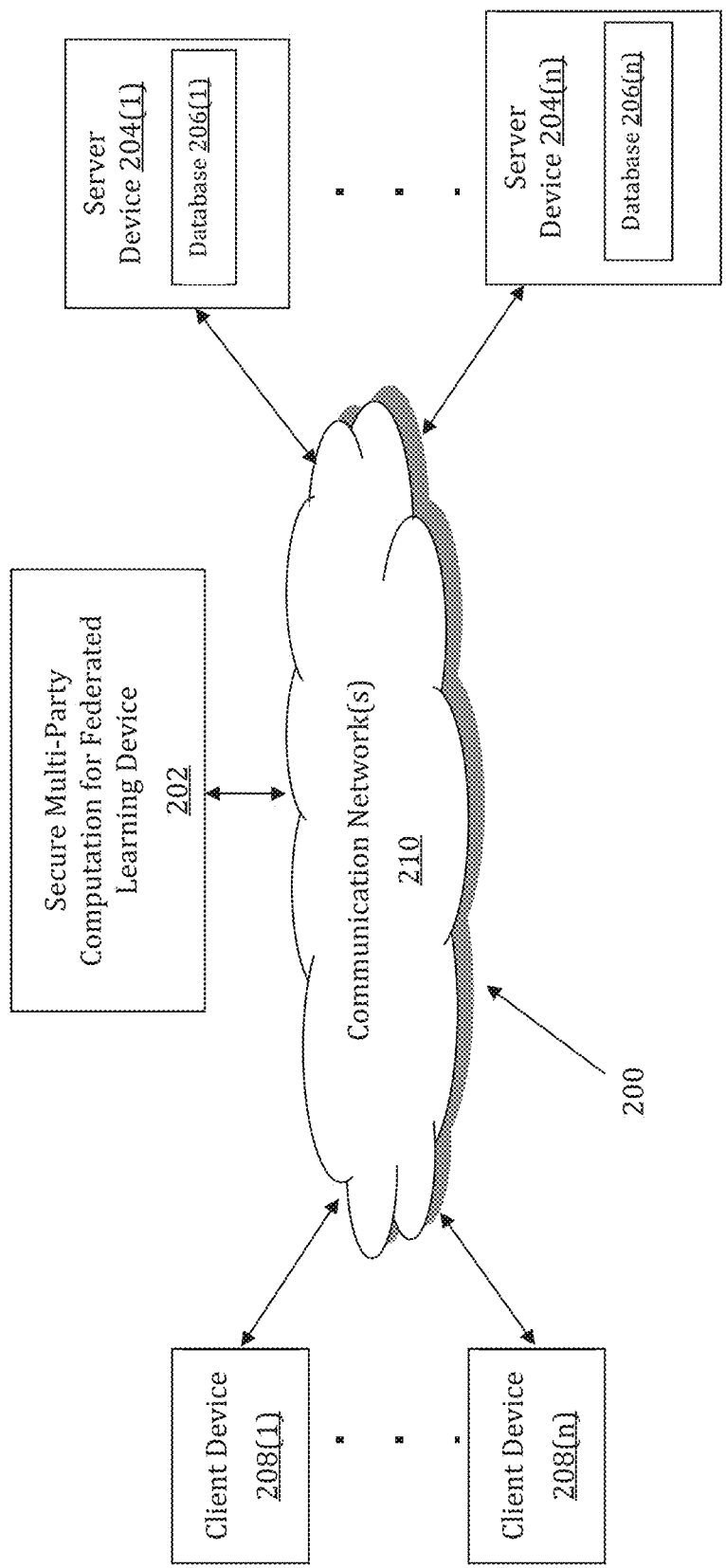
FIG. 2 illustrates an exemplary diagram of a network environment.

Referring to FIG. 2, a schematic of an exemplary network environment 200 for implementing a method for providing a secure aggregation protocol for federated learning based on secure multi-party computation is illustrated. In an exemplary embodiment, the method is executable on any networked computer platform, such as, for example, a personal computer (PC).

The method for providing a secure aggregation protocol for federated learning based on secure multi-party computation may be implemented by a Secure Multi-Party Computation for Federated Learning (SMPCFL) device 202. The SMPCFL device 202 may be the same or similar to the computer system 102 as described with respect to FIG. 1. The SMPCFL device 202 may store one or more applications that can include executable instructions that, when executed by the SMPCFL device 202, cause the SMPCFL device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SMPCFL device 202 itself, may be located in virtual server(s) running in a cloud-based computing environment rather than being tied to one or more specific physical network computing devices. Also, the application(s) may be running in one or more virtual machines (VMs) executing on the SMPCFL device 202. Additionally, in one or more embodiments of this technology, virtual machine(s) running on the SMPCFL device 202 may be managed or supervised by a hypervisor.

In the network environment 200 of FIG. 2, the SMPCFL device 202 is coupled to a plurality of server devices 204(1)-204(n) that hosts a plurality of databases 206(1)-206(n), and also to a plurality of client devices 208(1)-208(n) via communication network(s) 210. A communication interface of the SMPCFL device 202, such as the network interface 114 of the computer system 102 of FIG. 1, operatively couples and communicates between the SMPCFL device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SMPCFL device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SMPCFL devices that efficiently implement a method for providing a secure aggregation protocol for federated learning based on secure multi-party computation.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SMPCFL device 202 may be a standalone device or integrated with one or more other devices or apparatuses, such as one or more of the server devices 204(1)-204(n), for example. In one particular example, the SMPCFL device 202 may include or be hosted by one of the server devices 204(1)-204(n), and other arrangements are also possible. Moreover, one or more of the devices of the SMPCFL device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SMPCFL device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store public exchange data and any other data that relates to providing a secure aggregation protocol for federated learning based on secure multi-party computation.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SMPCFL device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SMPCFL device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SMPCFL device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SMPCFL device 202, the server devices 204(1)-204(n), or the client devices 208(1)-208(n), for example, may be configured to operate as virtual instances on the same physical machine. In other words, one or more of the SMPCFL device 202, the server devices 204(1)-204(n), or the client devices 208(1)-208(n) may operate on the same physical device rather than as separate devices communicating through communication network(s) 210. Additionally, there may be more or fewer SMPCFL devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
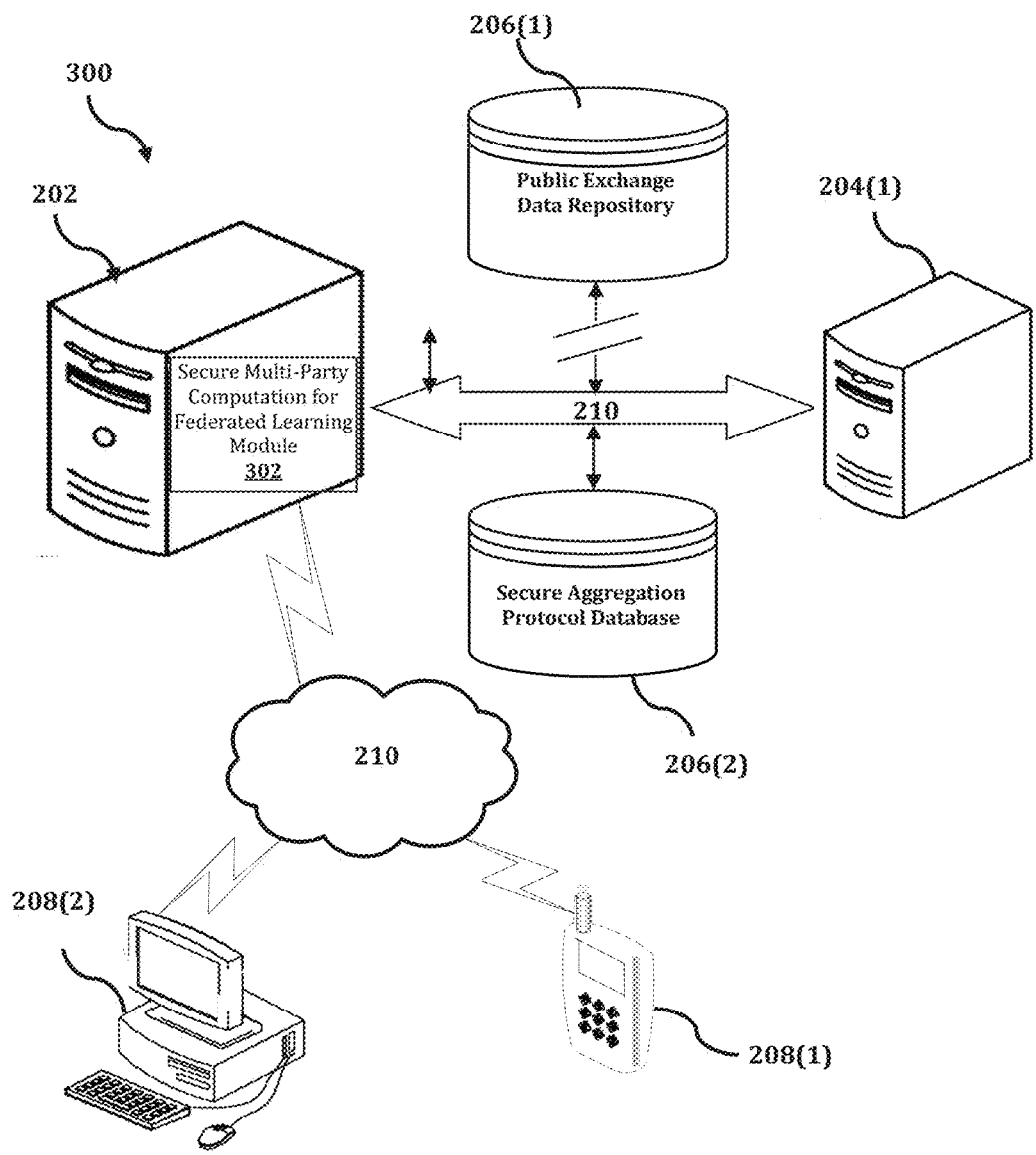
FIG. 3 shows an exemplary system for implementing a method for providing a secure aggregation protocol for federated learning based on secure multi-party computation.

The SMPCFL device 202 is described and illustrated in FIG. 3 as including a secure multi-party computation for federated learning module 302, although it may include other rules, policies, modules, databases, or applications, for example. As will be described below, the secure multi-party computation for federated learning module 302 is configured to implement a method for providing a secure aggregation protocol for federated learning based on secure multi-party computation.

An exemplary process 300 for implementing a mechanism for providing a secure aggregation protocol for federated learning based on secure multi-party computation by utilizing the network environment of FIG. 2 is illustrated as being executed in FIG. 3. Specifically, a first client device 208(1) and a second client device 208(2) are illustrated as being in communication with SMPCFL device 202. In this regard, the first client device 208(1) and the second client device 208(2) may be "clients" of the SMPCFL device 202 and are described herein as such. Nevertheless, it is to be known and understood that the first client device 208(1) and/or the second client device 208(2) need not necessarily be "clients" of the SMPCFL device 202, or any entity described in association therewith herein. Any additional or alternative relationship may exist between either or both of the first client device 208(1) and the second client device 208(2) and the SMPCFL device 202, or no relationship may exist.

Further, SMPCFL device 202 is illustrated as being able to access a public exchange data repository 206(1) and a secure aggregation protocol database 206(2). The secure multi-party computation for federated learning module 302 may be configured to access these databases for implementing a method for providing a secure aggregation protocol for federated learning based on secure multi-party computation.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SMPCFL device 202 via broadband or cellular communication. Of course, these embodiments are merely exemplary and are not limiting or exhaustive.

Upon being started, the secure multi-party computation for federated learning module 302 executes a process for providing a secure aggregation protocol for federated learning based on secure multi-party computation. An exemplary process for providing a secure aggregation protocol for federated learning based on secure multi-party computation is generally indicated at flowchart 400 in FIG. 4.

Figure 4:
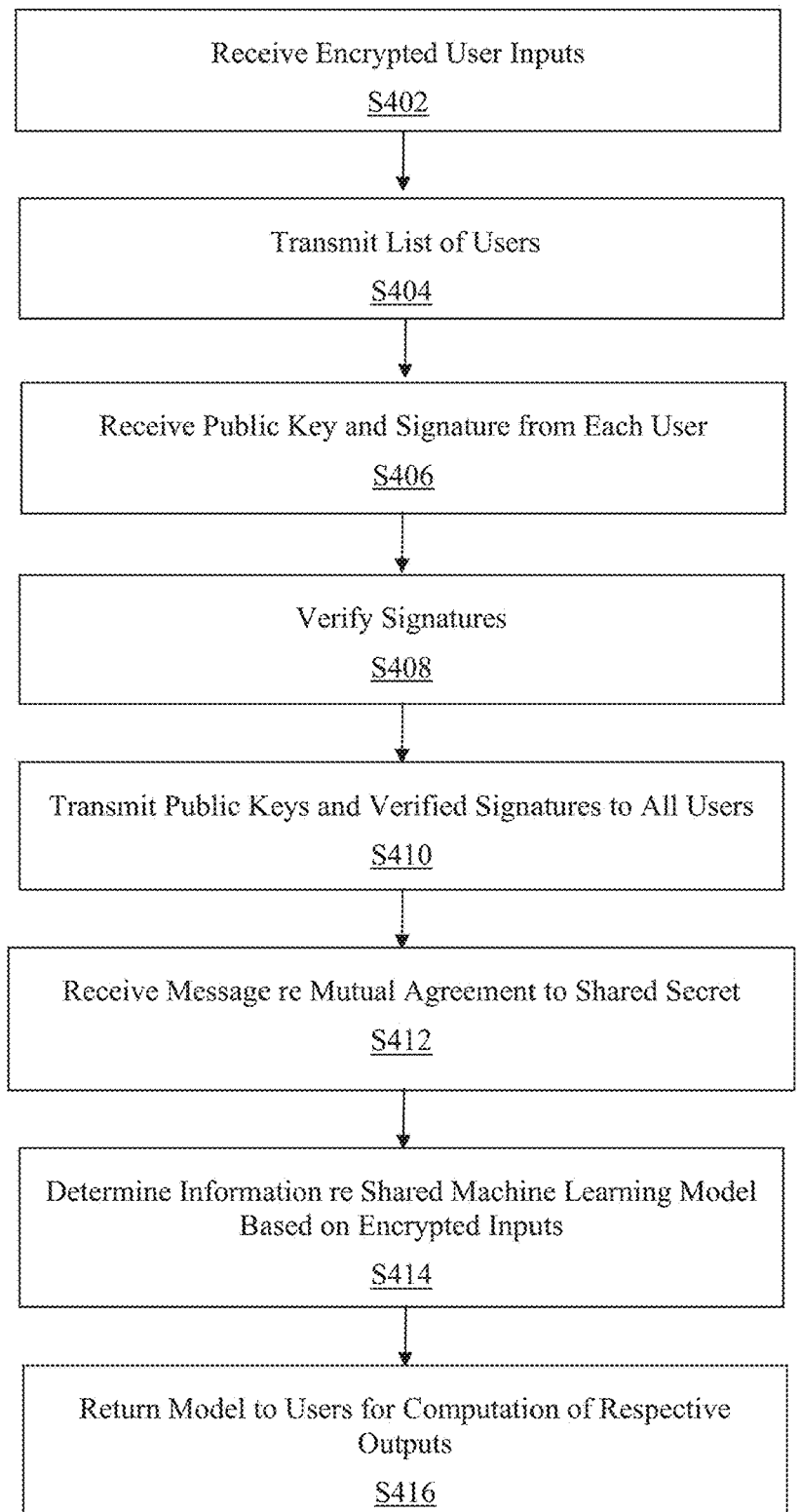
FIG. 4 is a flowchart of an exemplary process for implementing a method for providing a secure aggregation protocol for federated learning based on secure multi-party computation.

In process 400 of FIG. 4, at step S402, the secure multi-party computation for federated learning module 302 receives encrypted user inputs from several users that are interested in participating in a secure multi-party computation while preserving their own privacy and the confidentiality of their proprietary information. In an exemplary embodiment, each user input is encrypted by using a symmetric authenticated encryption algorithm in order to ensure that messages between honest parties cannot be either extracted by an adversary or tampered with without being detected.

At step S404, the secure multi-party computation for federated learning module 302 first determines whether a number of received encrypted user inputs is greater than or equal to a predetermined threshold. When the threshold has been satisfied, then a list of all participating users is transmitted to each user that has provided an encrypted input.

At step S406, the secure multi-party computation for federated learning module 302 receives a public encryption key and a signature from each user. Then, at step S408, the secure multi-party computation for federated learning module 302 verifies each signature. Upon successful verification, at step S410, the secure multi-party computation for federated learning module 302 transmits all public encryption keys and all signatures to each user. In an exemplary embodiment, these steps are implemented by using a Diffie-Hellman key exchange algorithm. In an exemplary embodiment, the secure multi-party computation for federated learning module 302 uses a public key infrastructure (PKI) to prevent a simulation of an arbitrary number of users.

At step S412, in response to the verification of the signatures, each user generates and transmits a message indicating a mutual agreement with respect to a shared secret among the users. Each message is received by the secure multi-party computation for federated learning module 302. Then, at step S414, based on the mutual agreement among the users, the secure multi-party computation for federated learning module 302 determines information regarding the shared machine learning model based on all of the encrypted user inputs. This determination represents the federated learning aspect with respect to the model, as it is based on using each individual input, while preserving privacy and confidentiality of information.

At step S414, the secure multi-party computation for federated learning module transmits the shared machine learning model to each user. In an exemplary embodiment, the shared machine learning model is configured to facilitate a secure multi-party computation of a function of all of the received encrypted user inputs, and the function is configured to generate a corresponding plurality of outputs such that each respective user only learns a single output from among the plurality of outputs that corresponds to the respective encrypted user input received from the respective user.

In an exemplary embodiment, the process 400 is applicable to a situation in which the users would benefit from collaborating with each other but are concerned about preserving privacy. For example, financial institutions such as banks may be mutually concerned about credit card fraud. In this circumstance, the group of users may include at least two financial institutions, each encrypted user input may correspond to a credit card transaction, and the shared machine learning model may be configured to determine whether each credit card transaction is a fraudulent credit card transaction.

Federated Learning enables a population of clients, working with a trusted server, to collaboratively learn a shared machine learning model while keeping each client's data within its own local systems. This reduces the risk of exposing sensitive data, but it may still be possible to reverse engineer information about a client's private data set from communicated model parameters. Most federated learning systems therefore use secure multiparty computation to hide the parameters from the server. In an exemplary embodiment, a new secure aggregation protocol for federated learning based on secure computation is provided.

One approach to mitigate privacy concerns is to analyze the multiple data sets separately and share only the resulting insights from each analysis. This approach is realized in a technique called federated analysis. Federated learning allows users to share insights, such as, for example, the parameters of a trained model, from the data on their laptops or mobile devices without ever sharing the data itself. The federated learning process may include the following steps:

1) Users train a local model on their individual data; 2) each user sends their model weights to a trusted server; 3) the server computes an average-weight shared model; 4) the shared model is returned to all of the users; and 5) users retrain a local model starting from the shared model.

For instance, email providers could use federated learning to reduce the amount of spam their customers receive. Instead of each provider using its own spam filter trained from its customers' reported spam email, the providers could combine their models to create a shared spam-detection mechanism, without sharing their individual customers' reported spam emails. It is still possible, however, for a malicious party to potentially compromise the privacy of the individual users by inferring details of a training data set from the trained model's weights or parameters. It is important to protect sensitive user information while still providing highly accurate inferences.

Differential Privacy: Simply anonymizing data is not sufficient to guarantee the privacy of individuals whose information has been collected, due to the increasing prevalence of database reconstruction attacks and re-identification from correlated data sets. Differential privacy can help prevent such reverse engineering by adding noise to the input data set, to intermediate calculations, or to the outputs. For example, in step 2 of the federated learning process described above, each client can add randomly-generated values to its model weights before transmission. Then, even if the data is reverse engineered, it is not the exact data of any user. More formally, differential privacy is a mathematical concept that guarantees statistical indistinguishability for individual inputs by perturbing values. The application of differential privacy adds a layer of randomness so that adversaries with additional information still have uncertainty over the original value. However, there is a trade-off: adding randomness to the collected data preserves user privacy at the cost of accuracy. Insights can still be derived from the aggregated data.

Secure Multi-Party Computation: Achieving a desired level of differential privacy can require adding a great deal of accuracy-reducing noise into the mix. An alternative method which guarantees privacy without compromising accuracy is secure multi-party computation (MPC). Using MPC, multiple parties collaborate to compute a common function of interest without revealing their private inputs to other parties. An MPC protocol is considered secure if the parties learn only the final result, and no other information.

For example, a group of employees might want to compute their average salary without any employee revealing their individual salary to any other employee. This task can be completed using MPC, such that the only information revealed is the result of the computation (i.e., the average salary). If each pair of employees holds a large, arbitrary, shared number, such that one employee will add it to their salary and the other will subtract it, then the result of the computation will not change, but no one will know any individual employee's real salary.

The same idea can be applied to federated learning by having the parties use a secure weighted average protocol, under which each client encrypts their model weights, but the server can still calculate the weighted average on the encrypted data.

Secure Federated Learning: In secure federated learning, clients encrypt the model weights sent in step 2 of the federated learning process described above. Assuming the encryption scheme is chosen appropriately, the server will still be able to perform the necessary calculation on the encrypted data, but will not be able to discover the original weights for any user.

MPC protects the computation inputs from exposure to the server, but the exact final result is revealed to all parties by design. However, for some types of computation, the final result can be used to reveal information about the inputs. For example, in the case of employees computing their average salary, once the result is known, if all but one of the employees work together, they can easily determine the salary of the final employee given the output (average salary). A secure learning approach based only on MPC may not be ideal for these cases.

By applying differential privacy on top of MPC, it is possible to construct a federated learning system that protects from even this type of extreme collusion attack. If each client adds noise to its model weights before sending, the final calculation will still be accurate within known bounds, but the possibility of leakage of any inputs from the output is then eliminated. In a solution which uses only differential privacy, the server would know the "noisy" private weights of each user. In the solution which combines MPC and differential privacy, the noisy weights sent to the server are also encrypted such that the server can calculate the result, but cannot infer anything about even the noisy weights of any particular user. The system is thus now fully private.

Differentially Private Secure Multi-Party Computation for Federated Learning: A protocol such as the one disclosed presently here, which combines federated learning, differential privacy, and secure multi-party computation, is of particular interest in the finance space. These firms operate under substantial regulation with respect to the use, protection, and disclosure of client information. Data sharing, even within a firm, is thus often difficult to achieve, with negative impacts in the ability to harness new techniques in artificial intelligence (AI) to improve key performance indicators at the firm, such as accurate estimation of loan failure rates, reduction of financial market transaction costs, or optimization of product pricing.

This combination approach can improve internal data protections while still enabling the application of powerful artificial intelligence (AI) to the company's data. By this approach, each client, server, or device's data can be kept securely in its originating silo, where local model training can safely occur, and the trained models can be shared and combined in an encrypted and differentially private manner. The data silos can thus each contribute to the overall organization learning an accurate, useful, and directly applicable model without increasing the exposure risk of any client's data. In addition, while no firm wants to give away a competitive advantage, the protocol can also improve models through secure inter-firm collaboration to lower market execution costs or more accurately price the risk component of a loan product, thus benefiting all participants.

In accordance with an exemplary embodiment, the following description demonstrates an approach to differentially private secure multi-party aggregation for federated learning by application to a well-known credit card fraud data set, and shows that client populations of varying size can collaboratively build a fraud detection model without sharing or revealing their local data. The key contributions include an demonstration of a protocol that enables secure learning of a shared fraud detection model in at most 30 protocol iterations on an extremely class-imbalanced real world data set.

Secure Multiparty Computation: Consider n parties $P_1, \ldots, P_n$ that hold private inputs $x_1, \ldots, x_n$ and wish to compute some arbitrary function (y1, ..., yn)= ƒ(x1, ..., xn), where the output of Pi is yi. Secure Multi-Party Computation (MPC) enables the parties to compute the function using an interactive protocol, where each party Pi learns exactly yi, and nothing else.

It is important that the security of the protocol be preserved even in the presence of adversarial behavior. For example, several leading banks might collaborate to learn an improved model to minimize the transaction costs associated with fulfilling client orders in a financial market. The privacy of each honest bank's individual client orders should be preserved even if other banks collude by pooling their information, revealing their encryption offsets, or deviating from the specified protocol.

In an exemplary embodiment, there is a focus on a semi-honest adversary who follows the protocol specification, but may attempt to learn honest parties' private information from the messages it receives, or to collude with other parties to learn private information.

In an exemplary embodiment, an application of federated learning with differential privacy and secure multi-party computation is illustrated with respect to a problem of collective interest in finance, that of accurately identifying fraudulent credit card transactions. This application typifies the case where multiple firms would individually and collectively profit from working together to eliminate the common problem of fraudulent purchases, as the occurrence of fraud benefits none of the lawful parties in the processing chain.

The current limitation to this type of cooperation is data sharing. The involved companies would not wish to share their local training data, that is their entire history of fraudulent and non-fraudulent transactions, including potentially sensitive customer and merchant information, and in many cases would be legally prohibited from doing so. A secure federated learning protocol could satisfy the firms and their regulators that data exposure risks have been sufficiently minimized to permit this mutually beneficial collaboration.

Federated learning is an iterative algorithm that follows a simple, repetitive process. The server chooses some users to produce an updated model. Those users train a model on their individual data, then send the model updates to the server. The server aggregates the updates to construct a new global model and shares it with all users.

In an exemplary embodiment, regressions is used as a local learning method, and each client update includes the weights of that regression. The server receives the weights from all clients at each iteration and computes the new global model using the average of the client updates for each weight. The server can infer some private client data from the trained model weights, which is clearly undesirable.

The following is an introduction of notations and several cryptographic primitives used in a secure aggregation protocol, according to an exemplary embodiment. The notation $[n_1, n_2]$ is used for two integers $n_1, n_2$ to denote the set of integers $\{n_1, \ldots, n_2\}$, and the left bound is omitted if it equals to 1, i.e., $[n]$ denotes the set $\{1, \ldots, n\}$. Let p, q be two primes such that $p=2q+1$.

The following is a listing of parameters and notations that appear below: 1) n: the total number of users; 2) K: the total number of iterations the protocol will run; 3) X: the domain of the secret input of each user in each iteration; 4) R: the size of the input domain, i.e., $|X|=R$; 5) B: the number of groups in the group version of the protocol.

Cryptographic Primitives. A function $f: N \to R$ is a negligible function if for every positive integer c there exists an integer $n_c$ such that for all $$n > n_c, f(n) < \frac{1}{n^c}.$$

It is understood that an event happens with negligible probability if its probability is a function negligible in the security parameter. Symmetrically, it is understood that an event happens with overwhelming probability if it happens with 1 but negligible probability.

It is understood that two ensembles of probability distributions $\{X_n\}_{n \in N}$ and $\{Y_n\}_{n \in N}$ are computationally indistinguishable (denoted with if for all non-uniform PPT distinguisher D, there exists a negligible function $f$ such that for all $n \in N$, $$|Pr_{t \leftarrow X_n}[D(1^n, t)=1] - Pr_{t \leftarrow Y_n}[D(1^n, t)=1]| \leq f(n).$$

Shamir's Secret Sharing. Shamir's t-out-of-n secret sharing is used to tolerate offline users. Informally speaking, it allows the secret holder to divide the secret into n shares such that anyone who knows t of them can reconstruct the secret, while anyone who knows less than t shares cannot learn anything about the secret.

Let s, $x_1, \ldots, x_n \in Z_q$ for some prime q. The Shamir's Secret Sharing scheme consists of two algorithms. First, SS.share(s, $\{x_1, x_2, \ldots, x_n\}$, t) $\to \{(s_1, x_1), \ldots, (s_n, x_n)\}$, in which s denotes the secret, $x_1, \ldots, x_n$ denotes the n indices, and t denotes the threshold of the secret sharing. This function returns a list of shares $s_i$ of the secret s with their corresponding indices $x_i$. Second, SS.recon $(\{(s_1, x_1), \ldots, (s_n, x_n)\}$, t)=s, in which each pair $(s_i, x_i)$ denotes the share $s_i$ on index $x_i$. This function returns the original secret s.

The first function can be implemented by uniformly randomly choosing t-1 coefficients $a_1, \ldots, a_{t-1}$ from $Z_q$ and calculates $s_i = f(x_i)$ for $f(x) = s + a_1 x + \ldots + a_{t-1} x^{t-1}$. The function $f$ can be reconstructed from the shares with the Lagrange basis polynomials.

More specifically, let $$\ell i(x) = \prod_{j=i, j \in [n]} \frac{x - x_j}{x_i - x_j},$$

then $f(x) = \sum_{i \in [n]} s_i \cdot \ell_i(x)$. Additionally, the following function is defined as an extension of Shamir's secret sharing. Let p,q be primes such that $p=2q+1$. Let $g \in Z_p^*$ be a generator of $Z_p^*$, and let s, $s_{i_j}, a_i \in Z_q$ for $i \in [t]$ and $i_j \in [q]$ for $j \in [n]$.

SS.exponentRecon$((g^{s_1}, x_1), (g^{s_n}, x_n), t) = \{g^s, g^{a_1}, \ldots, g^{a_{t-1}}\}$: With the shares $g^{s_1}, \ldots, g^{s_n}$, it returns the secret and the polynomial coefficients of the Shamir secret sharing in the exponent. More precisely, it returns $\{g^s, g^{a_1}, \ldots, g^{a_{t-1}}\}$ such that for $f(x) = s + a_1 x + \ldots + a_{t-1} x^{t-1}$, $f(x_i) = s_i$ for $i \in [n]$. This function can be implemented without knowing $S_1, \ldots, s_n$ by performing all the linear operations in the exponent.

Decisional Diffie-Hellman (DDH) Assumption. In an exemplary embodiment, the following assumption holds:

Definition 1.1 (Decisional Diffie-Hellman (DDH) Assumption). Let p,q be two primes, $p=2q+1$. Let g be a generator of $Z_p^*$. Then the following two distributions are computationally indistinguishable, given that a, b, c are independently and uniformly randomly chosen from $Z_q$:

$$(g^a, g^b, g^{ab}) \text{ and } (g^a, g^b, g^c).$$

Diffie-Hellman Key Exchange. The Diffie-Hellman key exchange algorithm allows two parties to securely agree on a symmetric secret over a public channel, assuming the discrete log problem is computationally hard. It consists of three algorithms. First, KA.setup(K)→(G',g,q,H), in which G' is a group of order q with a generator g, H is a hash function. Second, KA.gen(G',g,q,H)→(x,g$^x$) in which x is uniformly sampled from $Z_q$. This algorithm generates a pair of keys used later in key exchange. The secret key x should be kept secret, while the public key g$^x$ will be disclosed to other parties for key exchange. Third, KA.agree $(x_u, g^{x_v}) \rightarrow s_{u,v} = H((g^{x_v})^{x_u})$. This algorithm allows party u to obtain the symmetric secret $s_{u,v}=s_{v,u}$ between party u and party v with its own secret key $x_u$ and the public key g$^{x_v}$ of party v.

Random Oracle. The existence of random oracle is assumed. Random oracle answers each unique query with a uniformly random response in its output domain. The random oracle is used to guarantee that all users and the server can access the same fresh randomness for each iteration.

In an exemplary embodiment, symmetric authenticated encryption is used to guarantee that the messages between honest parties cannot be either extracted by the adversary or be tampered without being detected. An authenticated encryption scheme consists of two algorithms: AE.enc (m,k)→c, which encrypts message m with a key k and generates a ciphertext c; and AE.dec(c,k)→m, which decrypts the ciphertext c with the key k and outputs the original message m. It is assumed that the scheme being used satisfies IND-CCA2 security.

A public key infrastructure (PKI) is an arrangement that binds public keys with the respective identities of participants and provides sender authentication for messages. The existence of PKI is assumed in order to guarantee that the server cannot simulate an arbitrary number of users.

Secure Aggregation with Random Oracle: In an exemplary embodiment, the secure aggregation protocol runs with one server and n users 1, 2, . . . , n, which can only communicate with the server through secure channels. The protocol consists of two phases: the Setup phase and the Aggregation phase. The Setup phase runs only once at the beginning of the protocol, and the Aggregation phase runs for K iterations after the Setup phase completes. It is assumed that each user holds a secret input at the beginning of each iteration of the Aggregation phase. Users can drop offline at any time point during the execution. If a user drops offline in some round in some iteration, it is assumed that the partial message that user might have already sent in the current round is ignored, and that user stays offline till the end of the current iteration. The offline users can come back online at the beginning of some later iterations. In the honest-but-curious setting, at the end of each iteration, the server is able to reconstruct the sum of the secrets of at least t users as long as there are t users online from the beginning to the end of that iteration if t≥[2n/3]+1. In the presence of malicious adversary, the protocol guarantees privacy for honest users when the server is corrupt as long as the adversary controls less than n/3 users.

Figure 5:
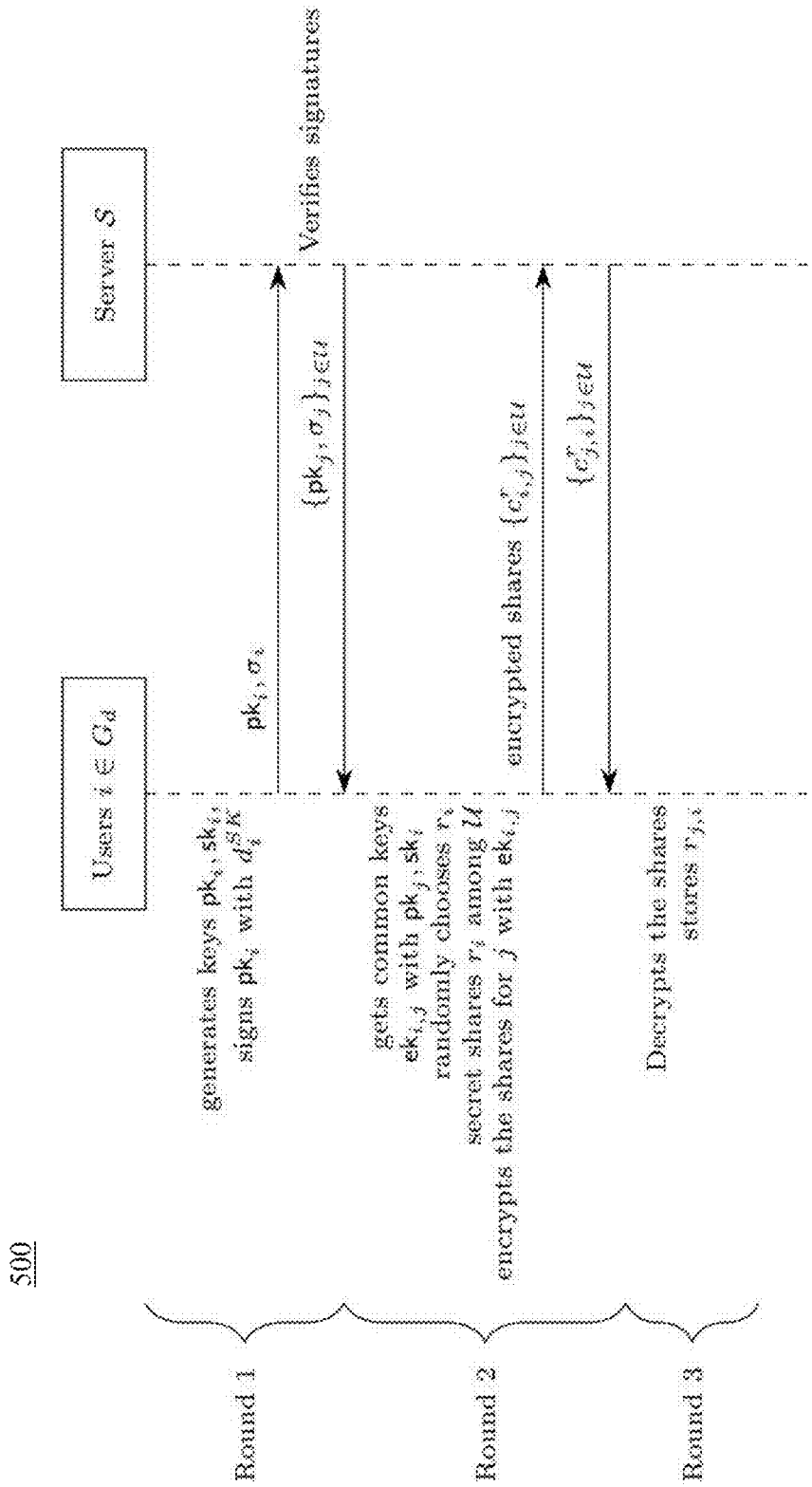
FIG. 5 is a diagram that illustrates an overview of a setup phase as part of a method for providing a secure aggregation protocol for federated learning based on secure multi-party computation, according to an exemplary embodiment.
Figure 6:
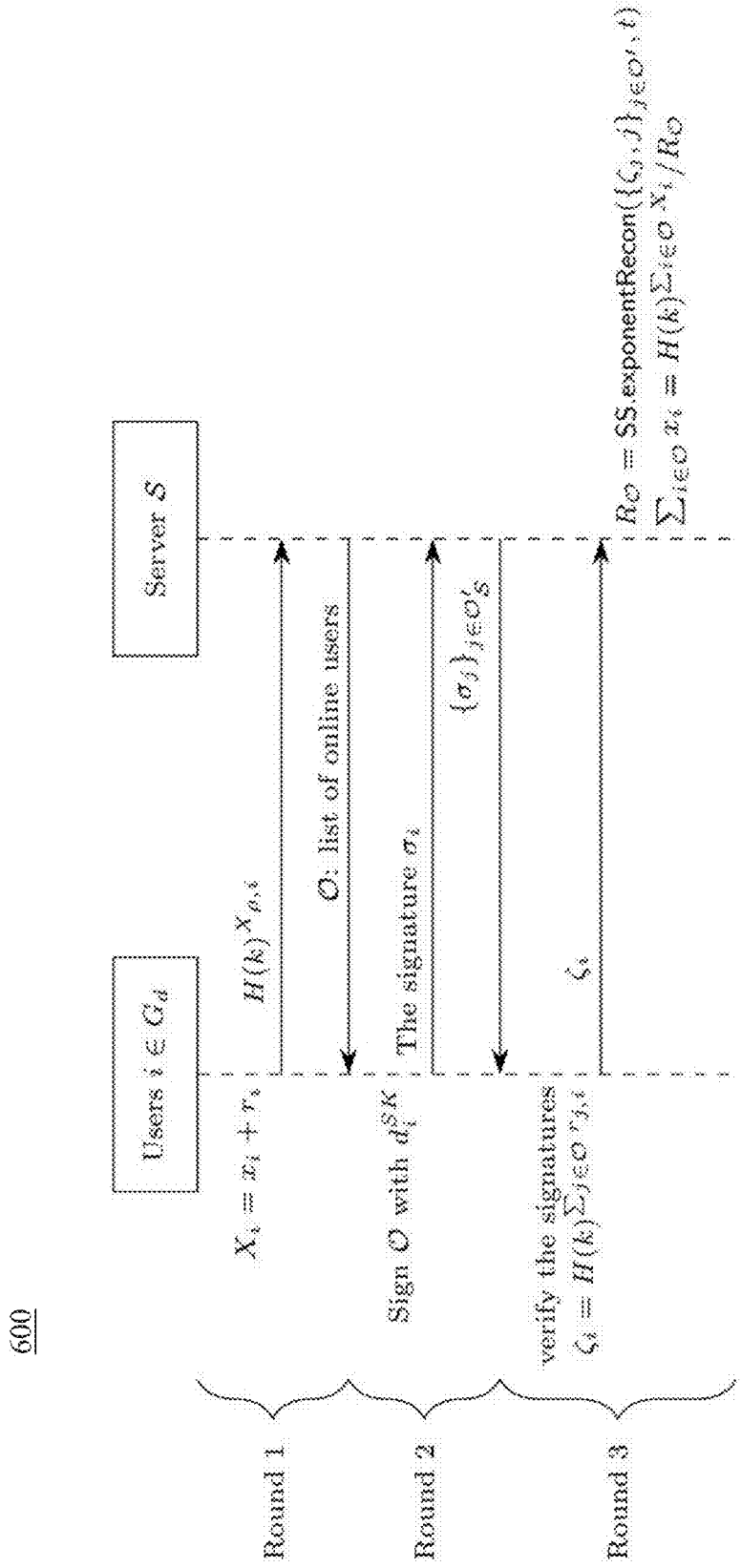
FIG. 6 is a diagram that illustrates an overview of an aggregation phase as part of a method for providing a secure aggregation protocol for federated learning based on secure multi-party computation, according to an exemplary embodiment.

FIG. 5 is a diagram 500 that illustrates an overview of a setup phase as part of a method for providing a secure aggregation protocol for federated learning based on secure multi-party computation, according to an exemplary embodiment. FIG. 6 is a diagram 600 that illustrates an overview of an aggregation phase as part of a method for providing a secure aggregation protocol for federated learning based on secure multi-party computation, according to an exemplary embodiment.

FIGS. 7A and 7B are a diagram 700 that illustrates a first algorithm for implementing a setup phase with random oracle as part of a method for providing a secure aggregation protocol for federated learning based on secure multi-party computation, according to an exemplary embodiment. FIGS. 8A and 8B are a diagram 800 that illustrates a second algorithm for implementing an aggregation phase with random oracle as part of a method for providing a secure aggregation protocol for federated learning based on secure multi-party computation, according to an exemplary embodiment.

A high level construction of the Setup phase in shown in FIG. 5, and a high level construction of the Aggregation phase is shown in FIG. 6. The details are described in Algorithm 1 and Algorithm 2, as illustrated in FIGS. 7A, 7B, 8A, and 8B.

Figure 9A:
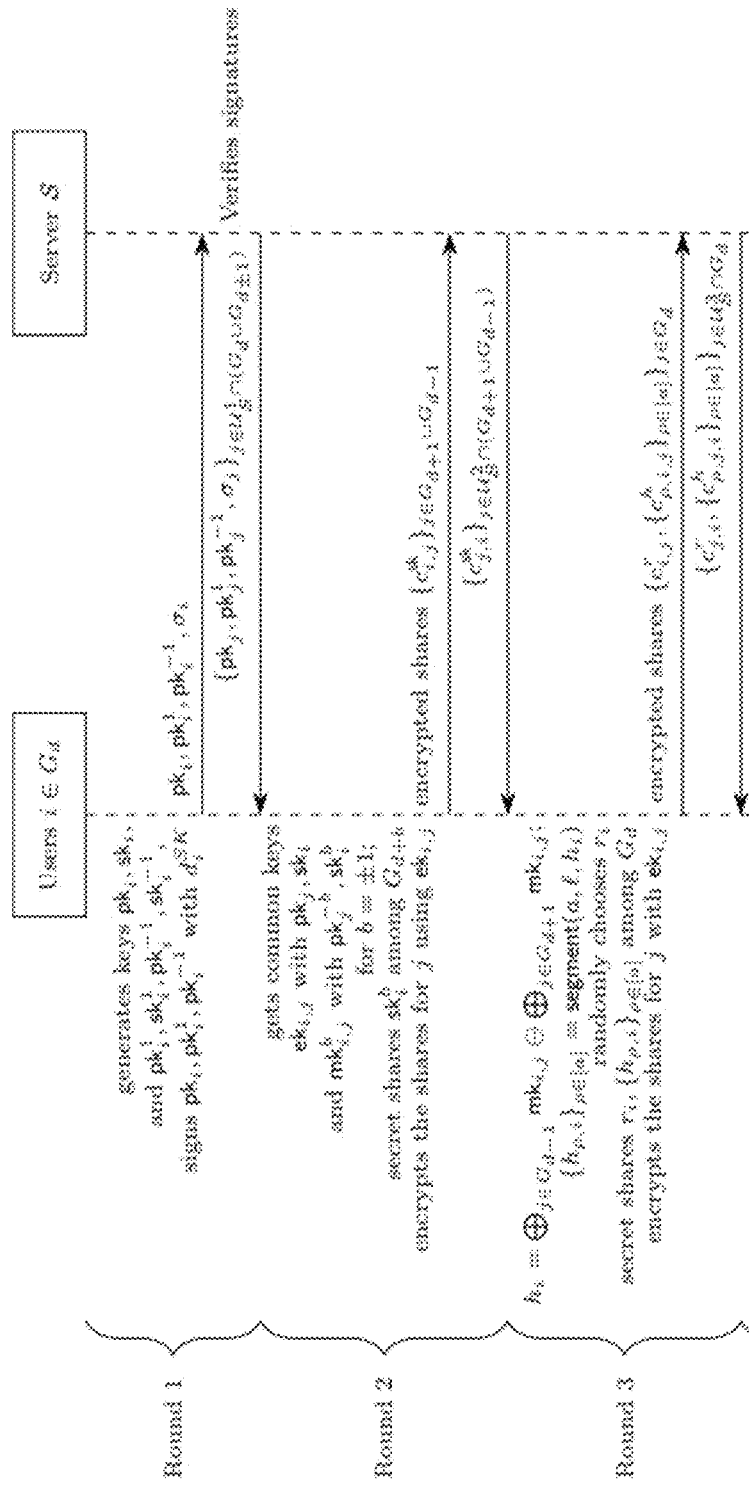
FIG. 9A and FIG. 9B are a diagram that illustrates an overview of a setup phase as part of a method for providing a secure aggregation protocol for federated learning based on secure multi-party computation, according to an exemplary embodiment.
Figure 9B:
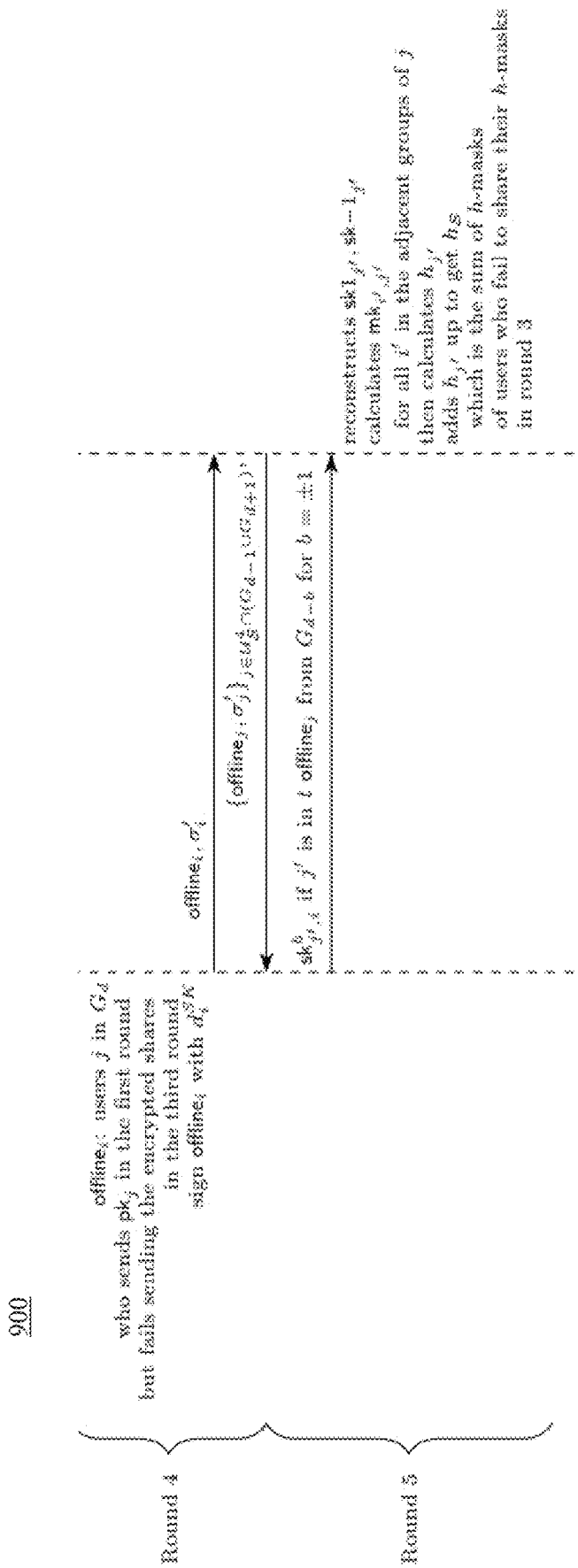
Figure 10:
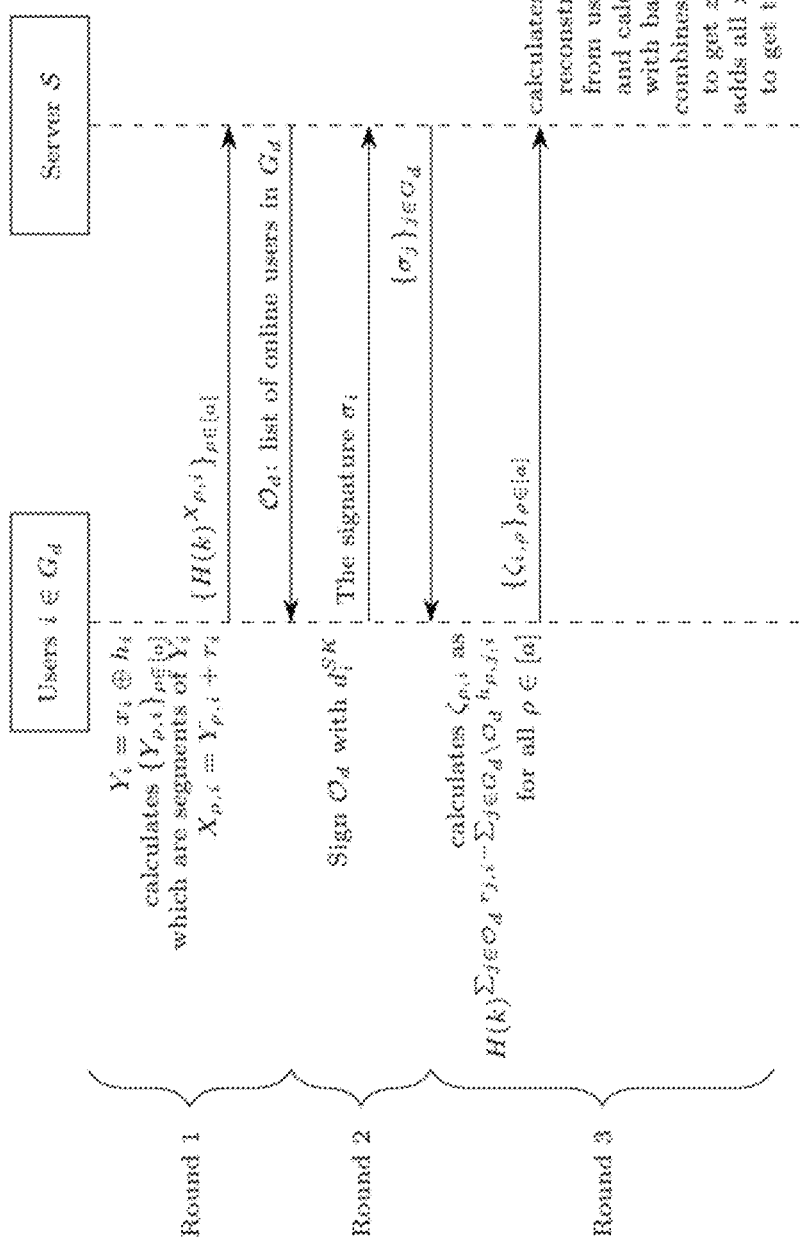
FIG. 10 is a diagram that illustrates an overview of an aggregation phase as part of a method for providing a secure aggregation protocol for federated learning based on secure multi-party computation, according to an exemplary embodiment.

FIG. 9A and FIG. 9B are a diagram 900 that illustrates an overview of a setup phase as part of a method for providing a secure aggregation protocol for federated learning based on secure multi-party computation, according to an exemplary embodiment. FIG. 10 is a diagram 1000 that illustrates an overview of an aggregation phase as part of a method for providing a secure aggregation protocol for federated learning based on secure multi-party computation, according to an exemplary embodiment.

FIGS. 11A, 11B, and 11C are a diagram 1100 that illustrates a third algorithm for implementing a setup phase with random oracle and grouping as part of a method for providing a secure aggregation protocol for federated learning based on secure multi-party computation, according to an exemplary embodiment. FIGS. 12A and 12B are a diagram 1200 that illustrates a second algorithm for implementing an aggregation phase with random oracle and grouping as part of a method for providing a secure aggregation protocol for federated learning based on secure multi-party computation, according to an exemplary embodiment Improvement with Grouping: In an exemplary embodiment, the secure aggregation protocol may be improved by including a grouping aspect. A high level construction of the Setup phase in shown in FIGS. 9A and 9B, and a high level construction of the Aggregation phase is shown in FIG. 10. The details are described in Algorithm 3 and Algorithm 4, as illustrated in FIGS. 11A, 11B, 11C, 12A, and 12B. In particular, the use of the grouping aspect improves the communication efficiency by dividing users into small groups, so that while in the Setup phase, each user only needs to share their mask with users included in the same group, and in the Aggregation phase, each user only needs to know the online status of its neighbors in the same group. The shared secret is used to mask the input (i.e., encrypt the input) of each individual user.

Accordingly, with this technology, an optimized process for providing a secure aggregation protocol for federated learning based on secure multi-party computation is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for learning a shared machine learning model while preserving privacy of individual participants, the method being implemented by at least one processor, the method comprising:
   receiving, from each respective user from among a plurality of users by the at least one processor, a respective encrypted user input,
       wherein the respective encrypted user input includes at least one model weight; and
       wherein each of the at least one model weight has been perturbed by adding randomly generated values;
   assigning each respective user and each respective encrypted user input to a corresponding group from among at least two groups;
   when, for each respective group, a number of received encrypted user inputs is greater than or equal to a predetermined threshold, transmitting, by the at least one processor to each respective user within the respective group, a list of the users within the respective group;
   receiving, from each respective user within the respective group by the at least one processor, a respective message indicating a mutual agreement regarding a shared secret among the users within the respective group; and when a number of received messages indicating the mutual agreement is greater than or equal to the predetermined threshold, determining, by the at least one processor, information about the shared machine learning model by combining the received encrypted user inputs within the respective group, wherein the shared machine learning model is configured to facilitate a secure multi-party computation of a function of all of the received encrypted user inputs; and wherein the function is configured to generate an updated version of the shared machine learning model such that each respective user only learns the updated version of the shared machine learning model; and wherein the randomly generated values are generated by using a random oracle that is configured to guarantee that all users access a fresh randomness for each iteration of generating the randomly generated values.

2. The method of claim 1, further comprising:

receiving, from each respective user, a public encryption key and a respective signature;

verifying each respective signature; and transmitting, to each respective user, all received public encryption keys and all received signatures;

wherein the respective message that indicates the mutual agreement is generated by each respective user in response to a verification of the signatures.

3. The method of claim 2, wherein the method is implemented by using a Diffie-Hellman key exchange algorithm.

4. The method of claim 1, wherein each received encrypted user input is encrypted by using an encryption algorithm.

5. The method of claim 1, further comprising using a public key infrastructure (PKI) to prevent a simulation of an arbitrary number of users.

6. The method of claim 1, wherein the plurality of users includes at least two financial institutions, each respective encrypted user input corresponds to a credit card transaction, and the shared machine learning model is configured to determine whether each credit card transaction is a fraudulent credit card transaction.

7. A computing apparatus for learning a shared machine learning model while preserving privacy of individual participants, the computing apparatus comprising:

a processor;

a memory; and a communication interface coupled to each of the processor and the memory, wherein the processor is configured to:

receive, from each respective user from among a plurality of users via the communication interface, a respective encrypted user input, wherein the respective encrypted user input includes at least one model weight; and wherein each of the at least one model weight has been perturbed by adding randomly generated values;

assign each respective user and each respective encrypted user input to a corresponding group from among at least two groups;

when, for each respective group, a number of received encrypted user inputs is greater than or equal to a predetermined threshold, transmit, to each respective user within the respective group via the communication interface, a list of the users within the respective group;

receive, from each respective user within the respective group via the communication interface, a respective message indicating a mutual agreement regarding a shared secret among the users within the respective group; and when a number of received messages indicating the mutual agreement is greater than or equal to the predetermined threshold, determine information about the shared machine learning model by combining the received encrypted user inputs within the respective group, wherein the shared machine learning model is configured to facilitate a secure multi-party computation of a function of all of the received encrypted user inputs; and wherein the function is configured to generate an updated version of the shared machine learning model such that each respective user only learns the updated version of the shared machine learning model; and wherein the randomly generated values are generated by using a random oracle that is configured to guarantee that all users access a fresh randomness for each iteration of generating the randomly generated values.

8. The computing apparatus of claim 7, wherein the processor is further configured to:

receive, from each respective user via the communication interface, a public encryption key and a respective signature;

verify each respective signature; and transmit, to each respective user via the communication interface, all received public encryption keys and all received signatures;

wherein the respective message that indicates the mutual agreement is generated by each respective user in response to a verification of the signatures.

9. The computing apparatus of claim 8, wherein the processor is further configured to implement the verification of the signatures and the transmission of the received public encryption keys and the received signatures by using a Diffie-Hellman key exchange algorithm.

10. The computing apparatus of claim 7, wherein each received encrypted user input is encrypted by using an encryption algorithm.

11. The computing apparatus of claim 7, wherein the processor is further configured to use a public key infrastructure (PKI) to prevent a simulation of an arbitrary number of users.

12. The computing apparatus of claim 7, wherein the plurality of users includes at least two financial institutions, each respective encrypted user input corresponds to a credit card transaction, and the shared machine learning model is configured to determine whether each credit card transaction is a fraudulent credit card transaction.

13. A non-transitory computer readable storage medium storing instructions for learning a shared machine learning model while preserving privacy of individual participants, the storage medium comprising executable code which, when executed by a processor, causes the processor to:

receive, from each respective user from among a plurality of users, a respective encrypted user input, wherein the respective encrypted user input includes at least one model weight; and wherein each of the at least one model weight has been perturbed by adding randomly generated values;

assign each respective user and each respective encrypted user input to a corresponding group from among at least two groups;

when, for each respective group, a number of received encrypted user inputs is greater than or equal to a predetermined threshold, transmit, to each respective user, a list of the users within the respective group;

receive, from each respective user within the respective group, a respective message indicating a mutual agreement regarding a shared secret among the users within the respective group; and when a number of received messages indicating the mutual agreement is greater than or equal to the predetermined threshold, determine information about the shared machine learning model by combining the received encrypted user inputs within the respective group, wherein the shared machine learning model is configured to facilitate a secure multi-party computation of a function of all of the received encrypted user inputs; and wherein the function is configured to generate an updated version of the shared machine learning model such that each respective user only learns the updated version of the shared machine learning model; and wherein the randomly generated values are generated by using a random oracle that is configured to guarantee that all users access a fresh randomness for each iteration of generating the randomly generated values.

14. The storage medium of claim 13, wherein the executable code is further configured to cause the processor to:

receive, from each respective user, a public encryption key and a respective signature;

verify each respective signature; and transmit, to each respective user, all received public encryption keys and all received signatures;

wherein the respective message that indicates the mutual agreement is generated by each respective user in response to a verification of the signatures.

15. The storage medium of claim 14, wherein the executable code is further configured to cause the processor to implement the verification of the signatures and the transmission of the received public encryption keys and the received signatures by using a Diffie-Hellman key exchange algorithm.

16. The storage medium of claim 13, wherein each received encrypted user input is encrypted by using an encryption algorithm.

17. The storage medium of claim 13, wherein the executable code is further configured to cause the processor to use a public key infrastructure (PKI) to prevent a simulation of an arbitrary number of users.

* * * * *